US005715517A

United States Patent [19]

Ide et al.

[11] Patent Number: 5,715,517

[45] Date of Patent: Feb. 3, 1998

[54] SELECTIVE CALLING RECEIVER WITH DISPLAY FUNCTION AND FIXED AND ARBITRARY STANDARDIZED EXPRESSIONS

[75] Inventors: Motoki Ide, Tokyo; Yasuyuki Mochizuki, Shizuoka, both of Japan

[73] Assignee: NEC Corporation, Tokyo, Japan

[21] Appl. No.: 362,158

[22] Filed: Dec. 22, 1994

[30] Foreign Application Priority Data

Dec. 28, 1993 [JP] Japan .................................... 5-336924

[51] Int. Cl.$^6$ .................................................... H04Q 7/14

[52] U.S. Cl. .................................... 455/38.4; 340/825.22; 340/825.44

[58] Field of Search ................................ 455/38.4, 38.1, 455/38.2, 38.3, 38.5, 228, 32.1, 89, 566, 575; 379/57; 340/825.44, 825.54, 825.22

[56] References Cited

U.S. PATENT DOCUMENTS 4,951,044 8/1990 Nelson et al. ..................... 455/32.1 X
5,095,307 3/1992 Shimura et al. ...................... 379/57 X
5,257,307 10/1993 Ise ............................................ 379/57
5,297,118 3/1994 Sakumoto ...................... 340/825.44 X
5,418,528 5/1995 Hosack et al. ................. 340/825.44 X
5,426,426 6/1995 Hymel .................................. 379/57 X

FOREIGN PATENT DOCUMENTS 393325 4/1991 Japan .
4312033 11/1992 Japan .

*Primary Examiner*—Reinhard J. Eisenzopf
*Assistant Examiner*—Philip J. Sobutka
*Attorney, Agent, or Firm*—Sughrue, Mion, Zinn, Macpeak & Seas, PLLC

[57] ABSTRACT

A radio selective calling receiver with a display function receives a call thereto upon reception of a numerical signal including a message, reads out a fixed or arbitrary standardized expression of standardized expressions stored in advance which is designated by the numerical signal, and displays the readout standardized expression. The receiver includes a registration section and a read selection section. The registration section registers the readout arbitrary standardized expression, as a protective message, in an EEPROM upon adding management information to the standardized expression. The read selection section selects whether to read out and display a protective message having management information added thereto of contents registered by the registration section, or read out and display information other than the management information.

6 Claims, 5 Drawing Sheets

SELECTIVE CALLING RECEIVER WITH DISPLAY FUNCTION AND FIXED AND ARBITRARY STANDARDIZED EXPRESSIONS

BACKGROUND OF THE INVENTION

The present invention relates to a radio selective receiver with a display function and, more particularly, to a radio selective calling receiver with a display function, which has a function of registering, receiving, and displaying arbitrary standardized expressions.

A conventional apparatus of this type can transmit a simple comment by using numerals or letters. It is, however, not practical to transmit a sentence from the viewpoint of transmission capacity and other limitations. For this reason, a plurality of standardized expressions are prepared on the receiving side so that when a number corresponding to a desired standardized expression is sent from the transmitting side, the desired standardized expression can be called and displayed. In this case, standardized expressions are classified into two types, i.e., arbitrary standardized expressions and fixed standardized expressions.

A fixed standardized expression is an ordinary sentence like "please call". A plurality of such sentences are registered in a ROM. The user cannot rewrite these sentences.

Assume that "1234-5678" is transmitted as a message, and the fixed standardized expression "please call" is selected from a plurality of fixed standardized expressions registered. This operation is equivalent to transmission of the sentence "please call 1234-5678". In this case, only "1234-5678" as the message and information for selecting the fixed standardized expression "please call" need to be actually transmitted, requiring a small amount of data transmitted as compared with a case wherein a full sentence is transmitted as a message.

Arbitrary standardized expressions are standardized expressions arbitrarily registered by the user. As such expressions, proper nouns such as place names and project names, frequently used sentences, telephone numbers, and the like are arbitrarily registered and used. If the registered contents are informed to a calling party in advance, the calling party can transmit a necessary sentence by transmitting information designating one of the arbitrary standardized expressions to the user together with a message in a paging operation. That is, sentences suitable for the user can be expressed by using arbitrary standardized expressions.

Arbitrary standardized expressions can be generally rewritten by a ROM writer or a switching operation, and are registered in an EEPROM whose stored contents are not lost even if power is not supplied. In addition, a received message can be registered in the EEPROM by a switching operation if the user wants to register it.

As a technique similar to this technique of registering arbitrary standardized expressions, a technique of registering protective messages is available. Especially, an important message is used as a protective message, which informs the user of the reception time, the number of times of reception, the address at which the message is registered, and the like as well as the message using an arbitrary standardized expression. One of methods of registering such protective messages is disclosed in Japanese Patent Laid-Open No. 3-93325, which includes a priority call preferential storage/protection means for inhibiting deletion of a stored message unless the user performs a delete operation when the received message has an identification code indicating a priority call, i.e., a header indicating a protective message. With this method, a message can be registered from the transmitting side onto the receiving side. However, since this priority call is stored in a message memory section using a RAM, if the battery is completely dead, even the message registered as the priority call is deleted.

Another method of registering protective messages is disclosed in Japanese Patent Laid-Open No. 4-312033, in which when a received message has a password following a special symbol which is added to the head of the message, the received message information is stored in a dedicated area in an EEPROM. In this case, information such as the reception time, the number of times of reception, and an storage address is stored in addition to the received message.

In the method of registering arbitrary standardized expressions by a ROM writer or a switching operation performed by the user, registration of arbitrary standardized expressions cannot be performed from the transmitting side of the paging system, resulting in a low degree of freedom in the method of registering arbitrary standardized expressions.

In the method of registering messages from the transmitting side, as protective messages, in an EEPROM on the receiving side, since the EEPROM is essentially used by the user to register messages, if a storage area is assigned as an area for storing protective messages, the storage area essentially used for registration is reduced. For this reason, the storage capacity must be increased.

SUMMARY OF THE INVENTION

The present invention has been made in consideration of the above situation, and has as its object to allow registration from the transmitting side onto the receiving side without increasing the storage capacity of an EEPROM.

In order to achieve the above object, according to the present invention, there is provided a radio selective calling receiver with a display function, which receives a call thereto upon reception of a numerical signal including a message, reads out a fixed or arbitrary standardized expression of standardized expressions stored in advance which is designated by the numerical signal, and displays the readout standardized expression, comprising registration means for registering the readout arbitrary standardized expression, as a protective message, in an EEPROM upon adding management information to the standardized expression, and read selection means for selecting whether to read out and display a protective message having management information added thereto of contents registered by the registration means, or read out and display information other than the management information.

DESCRIPTION OF THE PREFERRED EMBODIMENT

Figure 1:
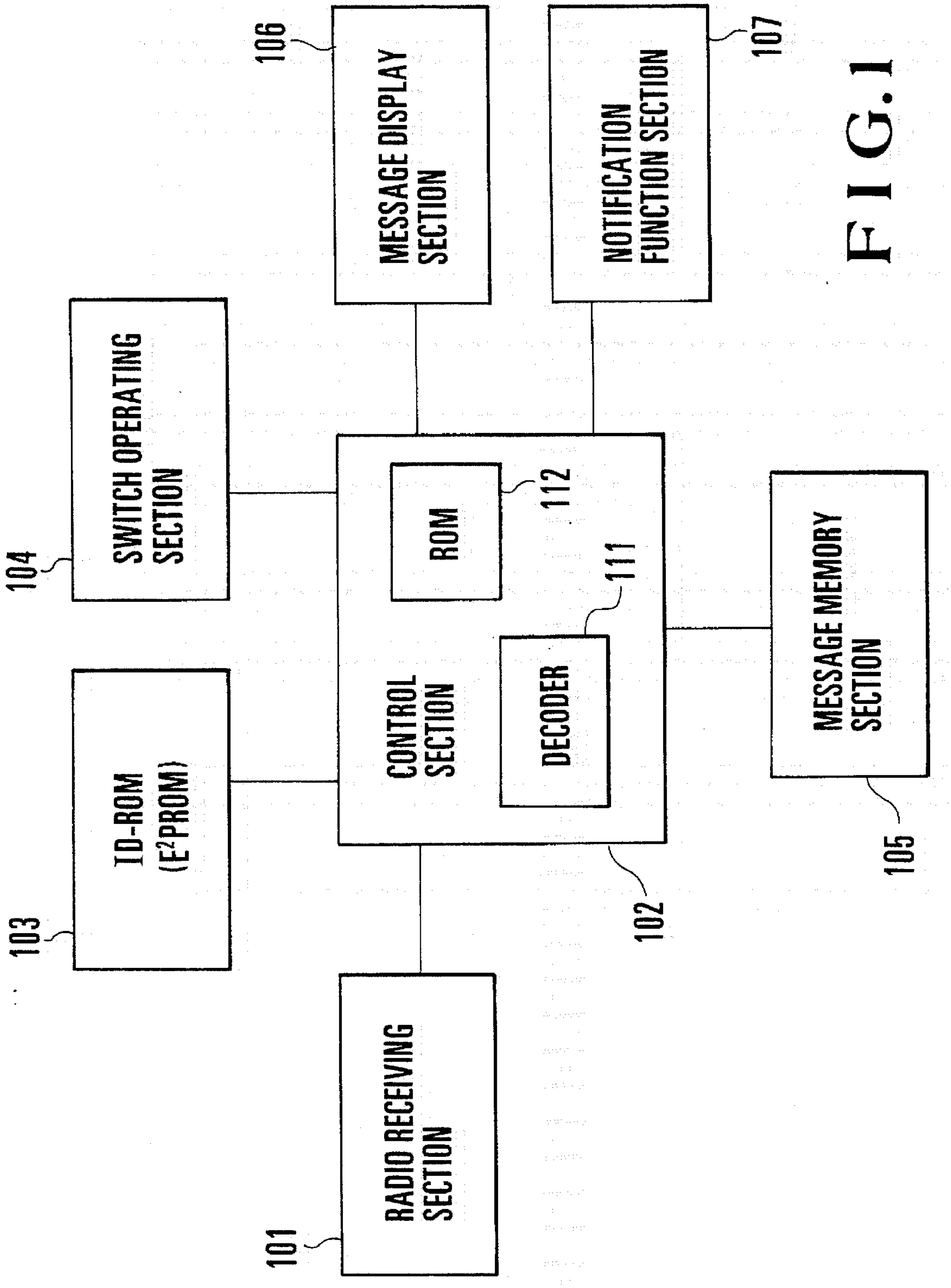
FIG. 1 is a block diagram showing an embodiment of the present invention.

FIG. 1 shows the arrangement of an embodiment of the present invention. A signal received by a radio receiving section 101 is supplied to a control section 102. The signal is decoded by a decoder 111 of the control section 102. The decoded message is stored in a message memory section 105 and displayed on a message display section 106. In addition, the reception of the message is notified by a notification function section 107.

Assume that a header is received following a message. In this case, if an arbitrary standardized expression is designated by information included in the header, the designated standardized expression is read out from an EEPROM 103. The expression is combined with the message and stored in the message memory section 105. The resultant message is then displayed on the message display section 106.

If a fixed standardized expression is designated by the header, the designated fixed standardized expression is read out from a ROM 112. The expression is then displayed in the same manner as described above, and the reception of the message is informed.

If the header is constituted by an arbitrary standardized expression registration code and an arbitrary standardized expression number, a sentence designated by the arbitrary standardized expression number is combined with the message and stored in the message memory section 105. In addition, management information such as the reception time and the number of times of reception is added to the message. The resultant message is then registered, as a protective message, in the EEPROM 103. In this case, if a plurality of protective messages are registered, one of the messages can be selected and displayed by a switch operating section 104.

Figures 2A, 2B, 2C:
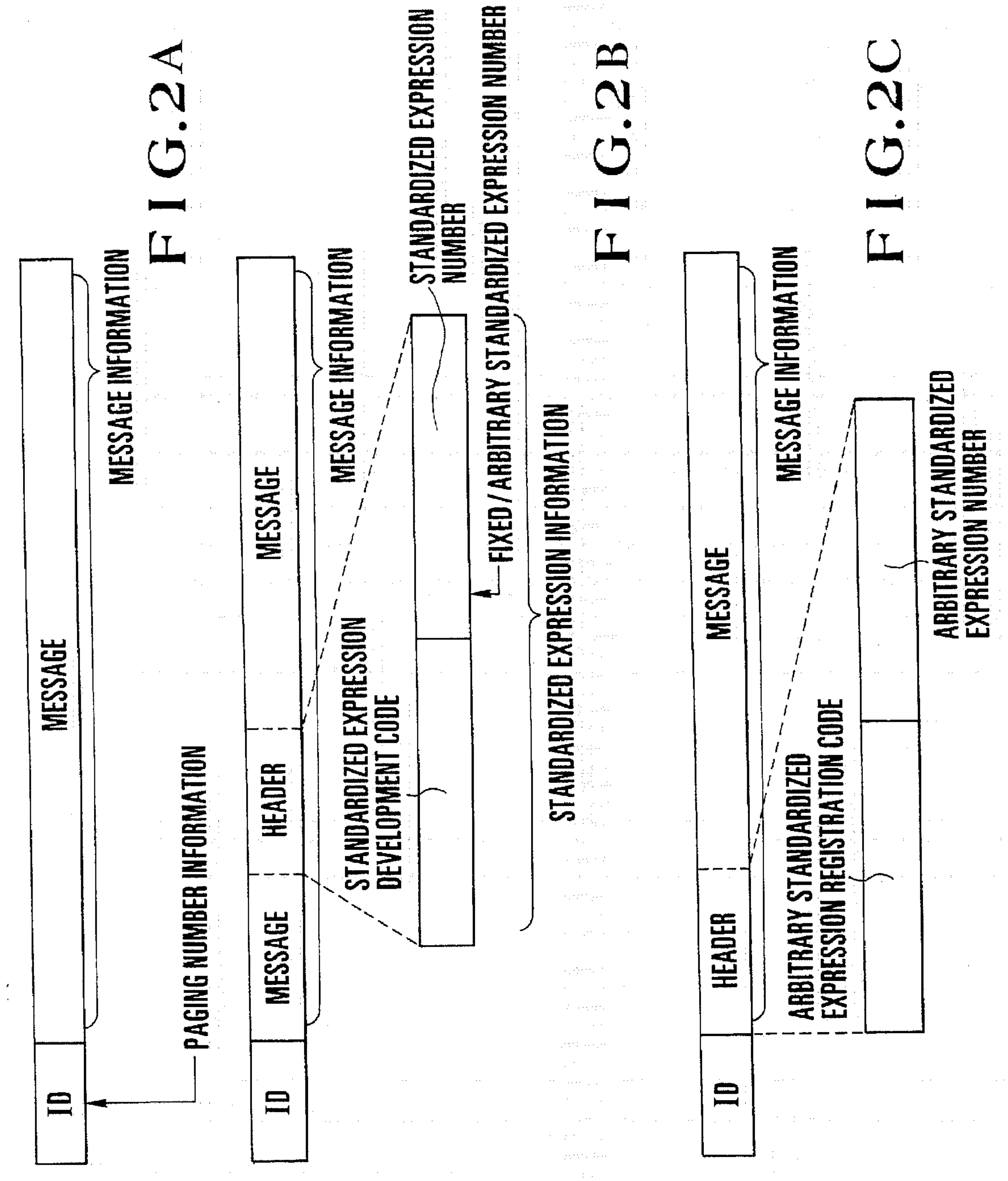
FIGS. 2A to 2C are charts respectively showing signal formats.

FIGS. 2A to 3B show the formats of numerical signals. FIG. 2A shows a case wherein only a message is to be transmitted. Message information is transmitted following ID information as paging number information. In this case, the message is stored in the message memory section 105. The contents of the message are displayed on the message display section 106. At the same time, the reception of the message is notified by the notification function section 107.

FIG. 2B shows a case wherein a standardized expression is to be displayed between messages. In this case, the standardized expression can be read out by transmitting a header. The header is constituted by a standardized expression development code for making the receiving side identify the information following the first message not as a message but as a fixed or arbitrary standardized expression, and a standardized expression number for reading out the corresponding standardized expression. In this case, the standardized expression may be a fixed or arbitrary standardized expression.

Assume that the first message is "1234-5678", the standardized expression read out in accordance with the header is "please call", and the last message is "MURAYAMA". In this case, the information to be displayed is "please call 1234-5678 MURAYAMA".

For example, "01" to "20" are assigned as standardized expression numbers for arbitrary standardized expressions, whereas "21" to "50" are assigned as standardized expression numbers for fixed standardized expressions. As the standardized expression development code, a symbol "--" is transmitted. Therefore, on the receiving side, two digits received after reception of a signal representing "--" can be recognized as a standardized expression number, and an arbitrary or fixed standardized expression is read out and displayed in accordance with the standardized expression number.

FIG. 2C shows a signal format for registration of an arbitrary standardized expression. In this case, a header is transmitted before a message. The header is constituted by an arbitrary standardized expression registration code and an arbitrary standardized expression number. As the arbitrary standardized expression registration code, for example, a symbol "]]" is used. After this symbol, one of the arbitrary standardized expression numbers "01" to "20" is transmitted. A message is transmitted after the arbitrary standardized expression number. Therefore, the message is added to the end of the designated arbitrary standardized expression, and the resultant information is stored at an available position in the protective message area of the EEPROM 103. Note that an available position is determined by the control section 102.

All arbitrary standardized expressions registered by using headers are registered as protective messages, and a message and a readout sentence are registered together with management information such as the reception time, the number of times of reception, and the address at which the message is stored.

As described above, in registering a protective message, an arbitrary standardized expression and corresponding management information are registered together. Therefore, when a protective message is displayed, both an arbitrary standardized expression and management information are displayed. If the management information is also required, no problem is posed in this operation. If, however, the management information is not required and only the sentence is required, unnecessary information is displayed, resulting in an increase in display pages and degradation of readability. That is, the operability of the receiver can be improved by displaying only the sentence or allowing the user to select whether to display the management information as well.

For this reason, in reading out a message, the user can select, by using the switch operating section 104, whether to display all information such as the reception time, the number of times of reception, and the address at which the message is stored, together with the readout sentence, i.e., a protective message or display only the readout sentence.

The switch section 104 is constituted by a menu switch, a "Δ" switch, a "∇" switch, and the like. A message is read out by depressing the "Δ" switch or the "∇" switch. A menu is displayed by depressing the menu switch. A value indicating a menu item is incremented by depressing the "∇" switch. When the "Δ" switch is depressed, an operation indicated by a displayed menu item is performed.

Menu items include arbitrary standard expression display, protective message display, and the like. When the arbitrary standard expression display item is selected, information other than management information is read out and arbitrary standard expressions are displayed on the message display section by depressing the "Δ" switch. When the protective message display item is selected, a protective message having management information added thereto is read out and displayed on the message display section by depressing the "Δ" switch.

Note that in a normal receiving operation, the latest or oldest message is displayed by depressing the "∇" or "Δ" switch.

Figure 3A:
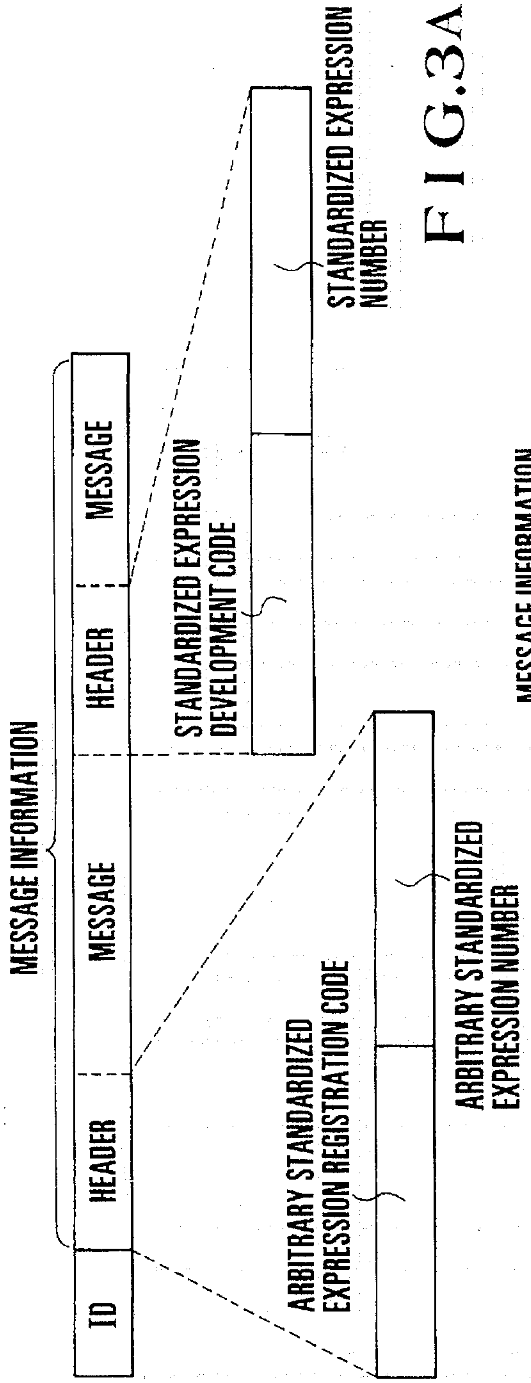
FIGS. 3A and 3B are charts respectively showing signal formats.
Figure 3B:
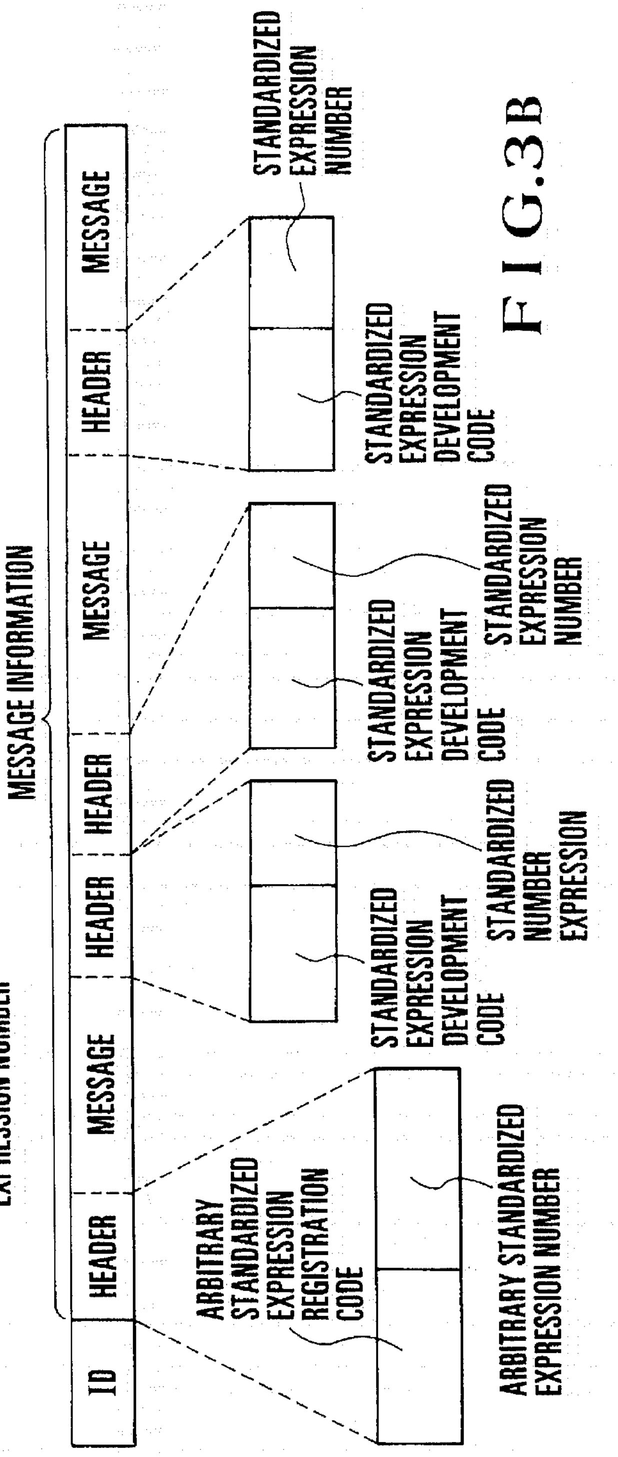

FIGS. 3A and 3B show application examples, and specifically examples of transmission of a plurality of standard expression development codes after registration of an arbitrary standard expression. These examples show that standard expression development codes can be set at any positions.

Upon reception of a numerical signal from a base station of the paging system (not shown), the radio receiving section 101 of this receiver supplies the numerical signal to the decoder 111 of the control section 102. The decoder 111 collates a received ID number with a self-ID number stored in the EEPROM 103 in advance. When these numbers coincide with each other, the control section 102 detects a call to the home receiver, and notifies the user of the reception of the call by using the notification function section 107 including at least one of the following devices: a speaker, a light-emitting diode, a vibrator, and the like.

At the same time, the control section 102 causes the message memory section 105 to store message information reproduced from the numerical signal, and also causes the message display section 106 to display the message information.

Before the message information is stored in the message memory section 105, the control section 102 checks whether the reproduced signal has a header including an arbitrary standardized expression registration code. If the signal has a header including an arbitrary standardized expression registration code, the control section 102 registers an arbitrary standardized expression corresponding to the header, as a protective message, in the arbitrary standardized expression registration area in the EEPROM 103. If the signal includes an arbitrary standardized expression development header, the control section 102 reads out an arbitrary standardized expression corresponding to the header from the EEPROM 103 and develops it in the message information.

Note that since different arbitrary standardized expressions can be registered as protective messages, one of them can be selected by using the switch operating section 104 to be displayed. In this case, the user operates the switch operating section 104 to determine whether to display the entire protective message including the sentence constituted by the message and the standardized expression and the accompanying information such as the recording time, or display only the sentence constituted by the message and the standardized expression.

As described above, in registering arbitrary standardized expressions, all the standardized expressions are registered, as protective messages, in the EEPROM. Therefore, an arbitrary standardized expression can be registered from the transmitting side onto the receiving side. In addition, since all arbitrary standardized expressions are registered, the user need not register a received message in the EEPROM. For this reason, unlike the prior art, the EEPROM need not have two areas, i.e., an area for protective messages and an area in which a received message is stored at the discretion of the user. This allows effective use of the storage area of the EEPROM. Furthermore, if an important message is stored, as an arbitrary standardized expression, in the EEPROM 103 so as not to be overwritten, loss of the important message due to loss of power can be prevented.

Figure 5:
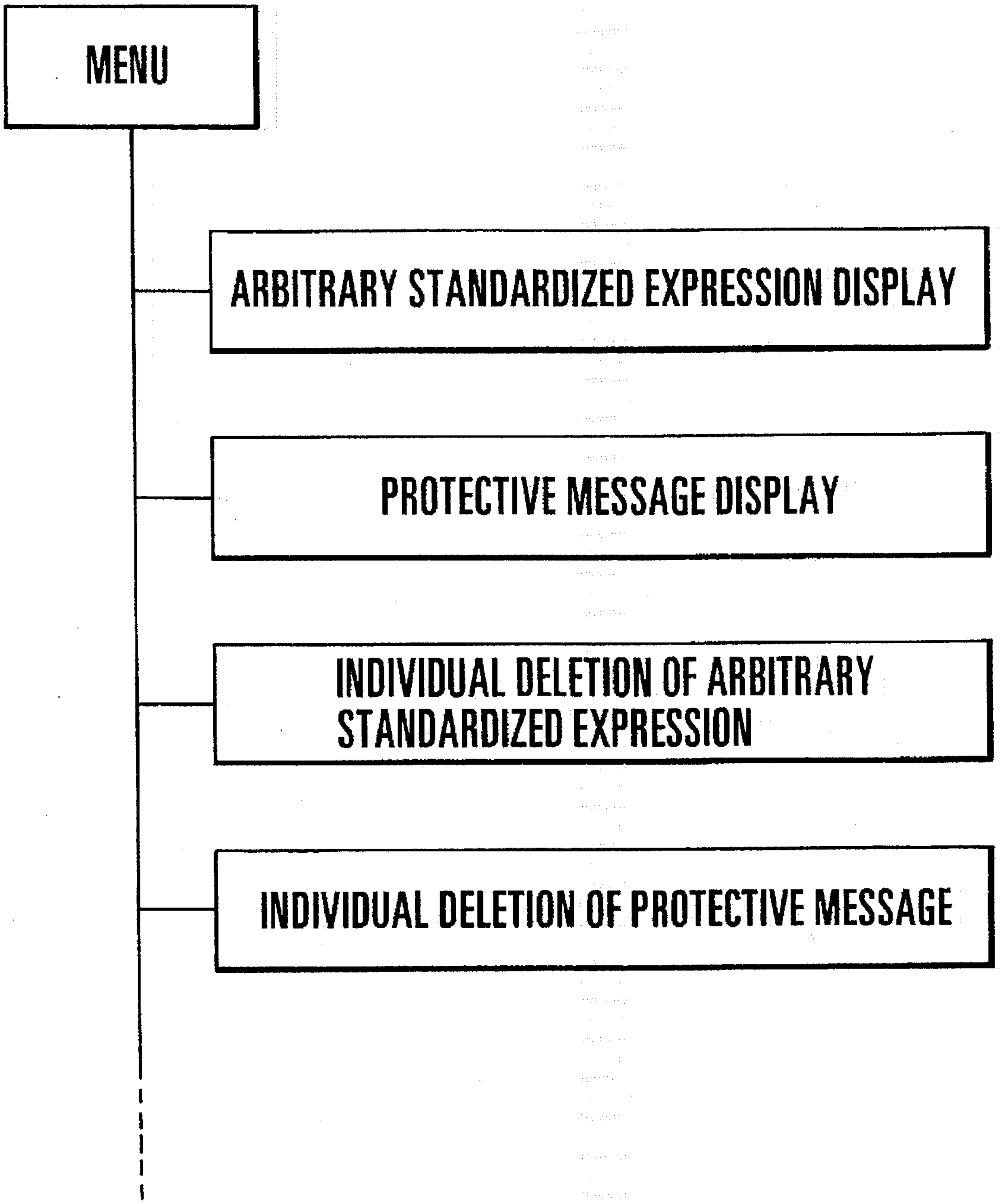
FIG. 5 is a view showing a menu screen.

In this case, as data is stored in the EEPROM, the EEPROM will be filled to capacity in due time. When this happens, the user can delete arbitrary standardized expressions or protective messages by performing a switching operation. For this delete operation, as shown in FIG. 5, an item of "individual deletion of arbitrary standardized expression" and an item of "individual deletion of protective message" are prepared in the menu. When one of these items is designated, a list of registered contents is displayed. The user selects unnecessary standardized expressions or messages from the list and deletes them.

Figure 4:
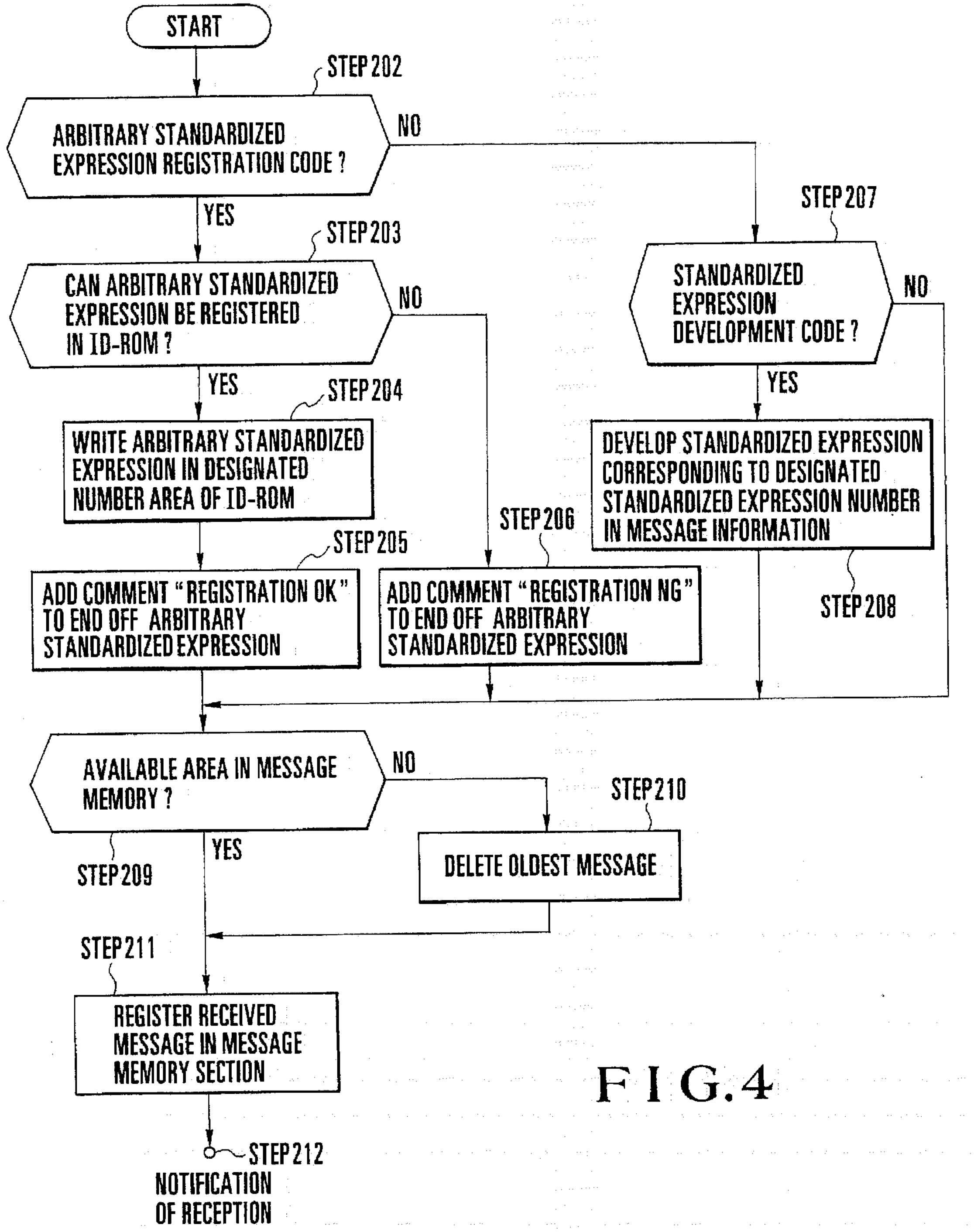
FIG. 4 is a flow chart showing the operation of the embodiment.

The operation of the embodiment in receiving standardized expression information will be described next with reference to the flow chart shown in FIG. 4.

Upon detecting a call to the home receiver from a numerical signal, the control section 102 starts an arbitrary standardized expression processing operation. In step 202, the control section 102 checks whether the received message information includes a header for registration of an arbitrary standardized expression. If YES in step 202, the control section 102 checks in step 203 whether an arbitrary standardized expression can be written in the EEPROM 103. That is, the control section 102 checks whether the user permits rewrite processing of an arbitrary standardized expression in the EEPROM 103.

When a write operation with respect to the EEPROM 103 is permitted, the control section 102 reads out a sentence corresponding to an arbitrary standardized expression number designated by the header from the EEPROM 103, and registers it in the arbitrary standardized expression area of the EEPROM 103 together with information as a message or a protective message in step 204. Subsequently, the control section 102 deletes the arbitrary standardized expression registration code, adds the comment "registration OK" to the end of the arbitrary standardized expression developed in the message information, and displays it.

The user, therefore, can know that the received signal is registered, by checking the display "registration OK".

If it is determined in step 203 that the EEPROM 103 is set to inhibit writing of the arbitrary standardized expression, the control section 102 does not register the arbitrary standardized expression in the EEPROM 103 but deletes the header for registration of the arbitrary standardized expression. Thereafter, in step 206, the control section 102 adds the comment "registration NG" to the end of the arbitrary standardized expression developed in the message information.

If it is determined in step 202 that the message information includes no header for registration of an arbitrary standardized expression, the control section 102 checks in step 207 whether the message information includes a standardized expression development code. If YES in step 207, the control section 102 deletes the standardized expression development code from the received message. In step 208, the control section 102 develops a standardized expression corresponding to the standardized expression number in the message information. In this case, a fixed standardized expression is read out from the ROM 112, whereas an arbitrary standardized expression is read out from the EEPROM 103.

Note that if it is determined in step 207 that there is no standardized expression development code, the flow immediately advances to step 209.

After the processing in step 205, 206, or 208 is performed, or it is determined in step 207 that there is no standardized expression development code, the control section 102 checks in step 209 whether there is an available area in the message memory section 105. If NO in step 209, the control section 102 deletes the oldest message stored in the message memory section 105 in step 210, and registers the received message information in this message area.

If there is an available area in the message memory section 105, the control section 102 registers the received message in this available message area in step 211.

As has been described above, according to the present invention, since all arbitrary standardized expressions are registered, as protective messages, in the EEPROM, a message can be registered from the transmitting side onto the receiving side, and the received message can be held even if the battery is dead. In addition, the EEPROM need not be divided into a protective message area and an area in which a received message is registered by the user. In reading out a registered protective message, the user can select whether to read out the message as a protective message or read out only the sentence. Therefore, the storage area of the EEPROM can be effectively used.

What is claimed is:

1. A radio selective calling receiver with a display function, which receives a call thereto upon reception of a numerical signal including a message, reads out a fixed or arbitrary standardized expression of standardized expressions stored in advance which is designated by the numerical signal, and displays the readout standardized expression, comprising:

means for receiving and processing a numerical signal containing fixed standardized expressions and arbitrary standardized expressions;

registration means for registering the readout arbitrary standardized expression, as a protective message, in an EEPROM upon adding management information to the arbitrary standardized expression; and read selection means for selecting whether to readout and display a protective message with management information appended or read out and display a protective message without appended management information.

2. The radio selective calling receiver of claim 1 wherein said receiver includes means for deletion of protective messages stored in said EEPROM.

3. A radio selective calling receiver with a display function, which receives a call thereto upon reception of a numerical signal, and displays a message included in the numerical signal, comprising:

an EEPROM for storing arbitrary standardized expressions;

a ROM for storing fixed standardized expressions;

reception notifying means for notifying that said receiver is paged by a numerical signal;

arbitrary standardized expression storage means for, means for, when an arbitrary standardized expression registration header is included in the numerical signal, reading out an arbitrary standardized expression designated by the arbitrary standardized expression registration header from said EEPROM, and storing the standardized expression in an empty area of said EEPROM;

standardized expression development means for, when a standardized expression development header is included in the numerical signal, reading out an arbitrary standardized expression designated by the standardized expression development header from said EEPROM if a standardized expression designated by the standardized expression development header is the arbitrary standardized expression, and reading out a fixed standardized expression from said ROM if a standardized expression designated by the standardized expression development header is the fixed standardized expression; and display means for displaying the standardized expression developed by said standardized expression development means.

4. A receiver according to claim 3, wherein the arbitrary standardized expression registration header includes an arbitrary standardized expression registration code indicating registration of an arbitrary standardized expression, and an arbitrary standardized expression number for designating one of the arbitrary standardized expressions stored in said EEPROM.

5. A receiver according to any one of claims 3 and 4, further comprising arbitrary standardized expression registration permission/inhibition determining means for determining whether an arbitrary standardized expression designated by a received numerical signal can be stored in said EEPROM, and display means for displaying the arbitrary standardized expression upon adding the determination result obtained by said arbitrary standardized expression registration permission/inhibition determining means to the arbitrary standardized expression.

6. A radio selective calling receiver, which receives a call thereto upon reception of a numerical signal containing a message, comprising:

means for receiving and processing fixed standardized expressions and arbitrary standardized expressions;

an EEPROM for storing arbitrary standardized expressions as protective messages;

storage means for storing fixed standardized expressions;

means for identifying arbitrary standardized expression registration information within said numerical signal, storing an arbitrary standardized expression represented by said registration information in said EEPROM, and reading out said arbitrary standardized expression from said EEPROM;

means for allowing a user to delete individual arbitrary standardized expressions from said EEPROM;

means for identifying said message within said numerical signal;

means for identifying an arbitrary standardized expression request within said message and reading out from said EEPROM a corresponding arbitrary standardized expression, and for identifying a fixed standardized expression request within said message and reading out a corresponding fixed standardized expression from said storage means; and means for displaying said message.

* * * * *